United States Patent
Shiflett et al.

(10) Patent No.: US 12,054,805 B2
(45) Date of Patent: Aug. 6, 2024

(54) METHODS FOR RECOVERING METALS USING OXALATE COMPOUNDS

(71) Applicant: University of Kansas, Lawrence, KS (US)

(72) Inventors: Mark Brandon Shiflett, Lawrence, KS (US); David Richard Corbin, West Chester, PA (US); Ankit Verma, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 631 days.

(21) Appl. No.: 17/243,032

(22) Filed: Apr. 28, 2021

(65) Prior Publication Data

US 2022/0349025 A1 Nov. 3, 2022

(51) Int. Cl.
| | |
|---|---|
| C22B 21/00 | (2006.01) |
| C01F 7/20 | (2006.01) |
| C01G 49/02 | (2006.01) |
| C22B 3/12 | (2006.01) |

(52) U.S. Cl.
CPC ............ *C22B 21/0015* (2013.01); *C01F 7/20* (2013.01); *C01G 49/02* (2013.01); *C22B 3/12* (2013.01)

(58) Field of Classification Search
CPC ......... C22B 21/0015; C22B 3/12; C01F 7/20; C01G 49/02
USPC .......................................................... 423/127
See application file for complete search history.

(56) References Cited

U.S. PATENT DOCUMENTS

| | | | |
|---|---|---|---|
| 2,927,001 A | 3/1960 | McCullough | |
| 4,275,043 A * | 6/1981 | Gnyra | ..................... C01F 7/473 423/127 |
| 8,137,647 B2 | 3/2012 | Corbin et al. | |
| 8,709,279 B2 | 4/2014 | Belharouak et al. | |
| 2008/0050295 A1 | 2/2008 | Uchida et al. | |
| 2009/0028772 A1 | 1/2009 | Nakaoka et al. | |
| 2010/0034714 A1* | 2/2010 | Corbin | ................... C01G 23/04 423/81 |

(Continued)

FOREIGN PATENT DOCUMENTS

| | | |
|---|---|---|
| CN | 101555030 A | 10/2009 |
| CN | 103594754 A | 2/2014 |

(Continued)

OTHER PUBLICATIONS

Ankit Verma et al, "Recycling of Spent Lithium-ion Batteries: Valuable Metal Extraction from Cathode Using Oxalate Chemistry," 2019 AIChE Annual Meeting, Nov. 11, 2019, Paper No. 211e; pp. 1-28.

(Continued)

*Primary Examiner* — Anthony J Zimmer
*Assistant Examiner* — Zachary John Baum
(74) *Attorney, Agent, or Firm* — Bell & Manning, LLC

(57) ABSTRACT

Methods for recovering a metal from a metal-containing material are provided. In embodiments, such a method comprises exposing a metal-containing material to a leaching solution comprising a solvent and a binoxalate, a tetraoxalate, or a combination thereof, under conditions to provide a leachate comprising a soluble metal oxalate; inducing precipitation of a metal-containing precipitate comprising the metal of the soluble metal oxalate from the leachate; and recovering the metal-containing precipitate.

23 Claims, 5 Drawing Sheets

(56) References Cited

U.S. PATENT DOCUMENTS

| | | | |
|---|---|---|---|
| 2012/0156497 A1 | 6/2012 | Boiko et al. | |
| 2012/0280171 A1 | 11/2012 | Belharouak et al. | |
| 2013/0292257 A1 | 11/2013 | Kaczur | |
| 2014/0206894 A1 | 7/2014 | Cole et al. | |
| 2021/0395857 A1 | 12/2021 | Shiflett | |

FOREIGN PATENT DOCUMENTS

| | | | |
|---|---|---|---|
| CN | 106129511 A | 11/2016 | |
| CN | 108767354 | 11/2018 | |
| CN | 108767354 A | 11/2018 | |
| EP | 3260560 B1 * | 10/2019 | ............... C01G 3/02 |
| WO | WO 2020086509 A1 | 4/2020 | |

OTHER PUBLICATIONS

The International Search Report and Written Opinion issued on Jan. 22, 2020 for International Patent Application No. PCT/US19/57319; pp. 1-12.

Sohn et al., "Comparison of two acidic leaching processes for selecting the effective recycle process of spent lithium ion battery," *Geosystem Engineering* 9.1 (Mar. 1, 2006): 1-6. Abstract, p. 3 col. 2 para 3; p. 4 col. 1 para 1-3; p. 4 para 1-8.

Zeng et al., "Novel approach to recover cobalt and lithium from spent lithium-ion battery using oxalic acid," *Journal of hazardous materials* 295 (Sep. 15, 2015): 112-118. Abstract, p. 112 col. 2 para 2: p. 114 col. 2 para 2—p. 115 col. 1 para 1; and p. 115 col. 2 para 2.

Yang et al., "Recovery of iron from red mud by selective leach with oxalic acid," *Hydrometallurgy* 157 (Oct. 1, 2015): 239-245. Abstract, p. 239 col. 1 para 1; p. 240 col. 1 para 3-4; p. 240 col. 2 para 4; p. 244 col. 1 para 2; Figure 2; and Figure 5.

Kang et al., "Preparation of cobalt oxide from concentrated cathode material of spent lithium ion batteries by hydrometallurgical method," *Advanced Powder Technology* 21.2 (Mar. 1, 2010): 175-179. Entire Document.

Sun et al., "Organic oxalate as leachant and precipitant for the recovery of valuable metals from spent lithium-ion batteries," *Waste Management* 32.8 (Aug. 1, 2012): 1575-1582. Entire Document.

Verma et al., "Role of Oxalate in Metal Separation and Recovery," 2019 AIChE Annual Meeting, Nov. 13, 2019.

Verma et al., "Separation of Lithium and Cobalt from LiCoO2: a Unique Critical Metals Recovery Process Utilizing Oxalate Chemistry," *ACS Sustainable Chemistry & Engineering*, 2020, vol. 8, No. 15; pp. 6100-6108.

Verma et al., "Recovery of Metals from Cathode of Lithium-Ion Batteries: a Closed-Loop Approach Using Oxalate Chemistry," 2019 AIChE Annual Meeting, Nov. 11, 2019.

* cited by examiner

METHODS FOR RECOVERING METALS USING OXALATE COMPOUNDS

BACKGROUND

Mineral commodities that are critical to the U.S. include aluminum (bauxite), antimony, arsenic, barite, beryllium, bismuth, cesium, chromium cobalt, fluorspar, gallium, germanium, graphite (natural), hafnium, helium, indium, lithium, magnesium, manganese, niobium, platinum group metals, potash, rare earth elements (REEs), rhenium, rubidium, scandium, strontium, tantalum, tellurium, tin, titanium, tungsten, uranium, vanadium, and zirconium.

The production of metals accounts for a significant amount of global energy in the U.S. and is a top contributor to $CO_2$ emissions. Processing of ores to basic metals has increased 70% in the past 10 years, with aluminum production leading the way. As a result, the quantity of waste products and pollutants has also significantly increased. There has been an attempt to modify or replace ore refining technologies to reduce pollution and waste emission; however, this has led to a decrease in metal extraction efficiency and an increase in the total process cost.

Regarding aluminum, this material is a lightweight metal with high strength to weight ratio, low melting point, corrosion resistance, good thermal and electrical conductivity, and high reflectivity. Globally, it is used in the production of high strength alloys in combination with other metals like nickel, zinc, copper, and manganese. These alloys are used in a range of applications that vary from kitchen utensils to automobile and aeronautical applications. The primary source of aluminum is bauxite where it is present in the form of alumina trihydrate like gibbsite ($Al_2O_3 \cdot 3H_2O$ or $Al(OH)_3$) or monohydrate minerals such as boehmite ($Al_2O_3 \cdot H_2O$ or $\gamma$-AlO(OH)) and diaspore ($Al_2O_3 \cdot H_2O$ or $\alpha$-AlO(OH)). Other minerals that can be found in bauxite include iron oxides ($Fe_2O_3$), quartz ($SiO_2$), and titanium dioxide ($TiO_2$).

The Bayer process is the most common industrial process for refining bauxite to smelting grade alumina. The process involves the digestion of crushed bauxite in concentrated sodium hydroxide solution at high temperature. This extraction process converts the aluminum oxide in the ore to soluble sodium aluminate from which aluminum trihydroxide is precipitated via seeding. Under these conditions, the majority of the aluminum-containing minerals are dissolved in the Bayer liquor, leaving behind an insoluble solid residue called red mud. The alumina industry is facing a global environmental issue because of the disposal problems associated with the caustic bauxite tailings: red mud. Typically, about 1 to 1.5 tons of red mud waste are produced from the production of 1 ton of alumina. To solve this problem, either red mud needs to be treated before disposal, or an alternative bauxite refining technology that can minimize waste production needs to be developed.

SUMMARY

Provided are methods for recovering metals from metal-containing materials, including bauxite, using certain oxalate compounds, including binoxalates and tetraoxalates. The oxalate ion is a bidentate anionic ligand that can donate two pairs of electrons to a metal ion. This electron-donating property allows the oxalate anion to bond with metal cations from two different sites within the ligand (i.e., called "chelation"). The present disclosure is based, at least in part, on the insight that if an acidic cation is present with the oxalate anion, leaching of metal from a metal-containing material with the coupled mechanism of metal dissolution and complexation can occur. Embodiments of the present methods provide optimum acidity for efficient critical metal extraction with no toxic waste emission, allow for end-of-process acid recovery, and achieve sustainable, economical, and energy-efficient critical metal recovery processes. In embodiments, a method for recovering a metal from a metal-containing material comprises exposing a metal-containing material to a leaching solution comprising a solvent and a binoxalate, a tetraoxalate, or a combination thereof, under conditions to provide a leachate comprising a soluble metal oxalate; inducing precipitation of a metal-containing precipitate comprising the metal of the soluble metal oxalate from the leachate; and recovering the metal-containing precipitate.

In embodiments, a method for recovering a metal from a metal-containing material comprises exposing bauxite to a leaching solution comprising a solvent and a binoxalate, a tetraoxalate, or a combination thereof, under conditions to provide a leachate comprising a Fe soluble metal oxalate and an Al soluble metal oxalate; inducing precipitation of a Fe-containing precipitate from the leachate by adjusting the leachate's pH to a first value; recovering the Fe-containing precipitate; inducing precipitation of an Al-containing precipitate from the leachate by adjusting the leachate's pH to a second value; and recovering the Al-containing precipitate.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
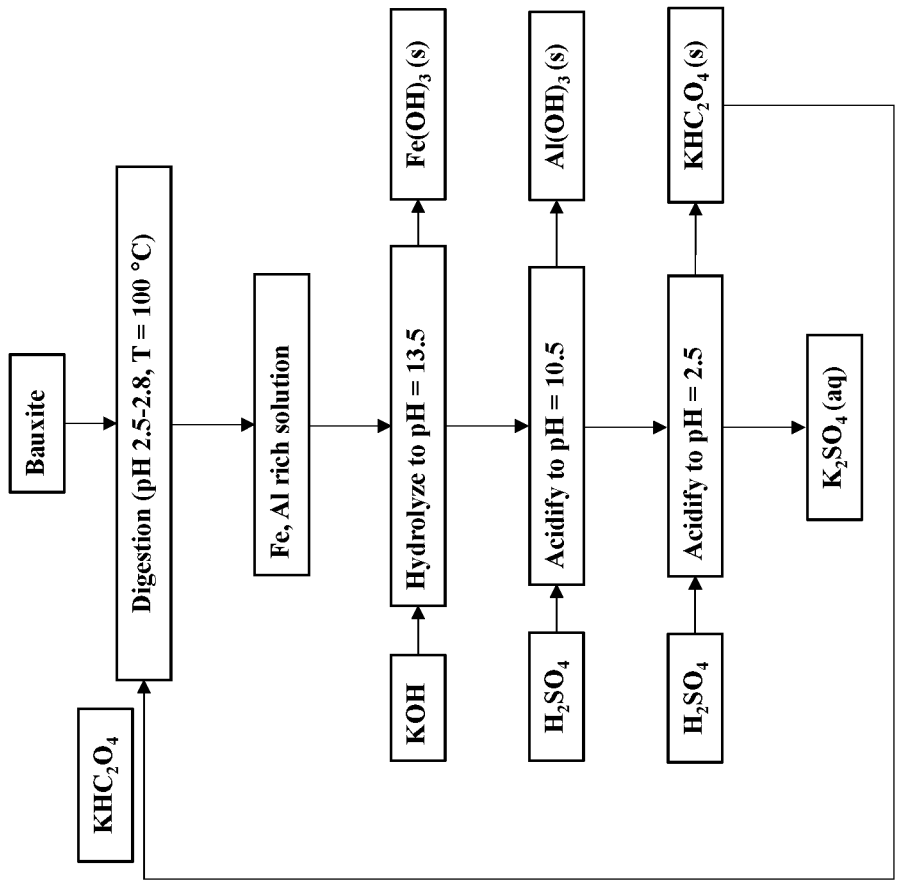
FIG. 1 is a flow-chart showing the recovery of iron (Fe) and aluminum (Al) from bauxite using $KHC_2O_4$, according to an illustrative embodiment of the present methods.

The present methods involve digestion of metal-containing materials using certain oxalate compounds and recovery of individual metals from which the metal-containing materials are composed. The methods may further include the recovery of the oxalate compounds, which may be recycled for re-use in a closed loop process. These steps are described further below.

The metal-containing material to be digested comprises different types of metals, which are generally present as distinct chemical compounds and/or mixed metal compounds composed of multiple types of metals. In embodiments, the metal-containing material is a mineral or an ore. Illustrative such metal-containing materials include bauxite (Al, Fe), ilmenite (Fe, Ti, Zr, V, Sc), laterite (Ni, Fe), and scheelite (W). (Metals in these metal-containing materials that may be recovered are indicated in parentheses.) Bauxite is an ore that is the primary source of aluminum. The aluminum is usually present in the form of alumina trihydrate such as gibbsite ($Al_2O_3 \cdot 3H_2O$ or $Al(OH)_3$) and monohydrate minerals such as boehmite ($Al_2O_3 \cdot H_2O$ or $\gamma$-AlO(OH)) and diaspore ($Al_2O_3 \cdot H_2O$ or $\alpha$-AlO(OH)). Other minerals that may be present include iron oxides ($Fe_2O_3$), quartz ($SiO_2$), and titanium dioxide ($TiO_2$). Ilmenite is an ore that is the primary source of titanium. The titanium is generally present in the form of $FeTiO_3$, although amounts of Zr, V, Sc, Mg, and Mn may also be present. Laterites are ores including various oxides, including iron oxides, nickel oxides, and others. Scheelite is an ore including $CaWO_4$. Other metal-containing materials may be digested using the present methods, such as an electrode material of a battery. For example, electrode materials from lithium-ion batteries (LIBs) include $LiCoO_2$, although amounts of Mn and Ni may also be present. Another metal-containing material is coal fly ash, which includes various rare earth elements such as Nb.

The present methods may be used to recover metals from a variety of metal-containing materials, including those described above. However, in embodiments, the metal-containing material is not ilmenite. In embodiments, the metal-containing material is not an electrode material of a LIB. In embodiments, the metal-containing material is bauxite.

Digestion

Digestion of the metal-containing material comprises exposing the metal-containing material to a leaching solution comprising a solvent and a binoxalate, a tetraoxalate, or a combination thereof dissolved therein. The solvent is generally water. The oxalate compound may be represented by the formula $AHC_2O_4 \cdot (H_2C_2O_4)_n$, wherein A is a cation and n is 0 or 1. In embodiments, n is 0 and the oxalate compound is a binoxalate. In embodiments, n is 1 and the oxalate compound is a tetraoxalate. In embodiments, A is an ammonium cation, $NR_4$, wherein each R is independently selected from a group consisting of hydrogen and an alkyl group. The alkyl group may be a methyl group, although other alkyl groups may be used. Although $NH_4HC_2O_4$ may be used as a possible binoxalate, in other embodiments, the binoxalate is not $NH_4HC_2O_4$. In embodiments, at least one R is not hydrogen. In embodiments, A is an alkali metal cation, such as Li, Na, K, etc. A single type or a combination of different types of oxalate compounds may be used. The binoxalates and tetraoxalates may be formed from an aqueous solution of oxalic acid ($H_2C_2O_4$) and the appropriate oxalate salt. Under the conditions of the digestion (further described below and in the Examples), the oxalic acid and oxalate salt react to form the desired binoxalate or tetraoxalate. By way of illustration, $KHC_2O_4$ may be formed from an aqueous solution of oxalic acid and dipotassium oxalate, $K_2C_2O_4$. The binoxalates and tetraoxalates disclosed herein also refer to the hydrated forms of these compounds, e.g., the term "potassium tetraoxalate" and formula "$KHC_2O_4 \cdot H_2C_2O_4$" encompass potassium tetraoxalate dihydrate" and "$KHC_2O_4 \cdot H_2C_2O_4 \cdot 2H_2O$."

The leaching solution may further comprise one or more additives. Illustrative additives include a reducing agent (e.g., a peroxide such as $H_2O_2$ or a solid metal of the metal to be recovered) or an oxidizing agent. In embodiments, however, certain components are excluded from the leaching solution. For example, in embodiments, the leaching solution is free of (i.e., does not comprise) oxalic acid. (This, however, does not preclude the presence of a small amount of oxalic acid remaining after the reaction with the appropriate oxalate salt to form the desired binoxalate/tetraoxalate.) As noted above, in embodiments, the leaching solution is free of (i.e., does not comprise) $NH_4HC_2O_4$. In embodiments, the leaching solution consists of water, the binoxalate/tetraoxalate, and optionally, a reducing agent or an oxidizing agent. In such embodiments, any of the oxalate compounds described herein may be used. However, in embodiments, the oxalate compound is an alkali metal binoxalate, an alkali metal tetraoxalate, or combinations thereof.

The exposure of the metal-containing material to the leaching solution takes place under conditions which induce the chemical conversion of the metal compound(s) of the metal-containing material into various other metal compounds, including soluble metal oxalate complexes. The term "leachate" is used to refer to the liquid portion of the processed mixture of the metal-containing material in the leaching solution. (For the remainder of this disclosure, the phrase "processed mixture" will be used to refer to the processed mixture of the metal-containing material in the leaching solution.) However, solids may be present in the processed mixture, either suspended within or precipitated out of the leachate. If present, these solids may be separated from the liquid portion (leachate), e.g., via filtration.

In embodiments, each of the desired metals of the metal-containing material are dissolved in the liquid portion (leachate). For example, in embodiments involving the digestion of bauxite, both Fe and Al metals may be dissolved in the leachate, e.g., as soluble oxalate complexes. (See FIGS. 1-3 "Fe, Al rich solution.")

However, in other embodiments, a desired metal may be the solid portion (or a component thereof) of the processed mixture, which may be separated, e.g., via filtration, and further processed as described below. For example, in other embodiments involving the digestion of bauxite, the Al metal may be dissolved in the liquid portion (leachate) of the processed mixture while the Fe metal may be present as the solid portion, e.g., an insoluble oxalate compound. (See, FIG. 5.) In this embodiment, precipitation of the iron oxalate was induced by including Fe metal in the digestion step.

Regarding the digestion conditions, these refer to parameters such as the type of oxalate compound, its concentration, the pH, the temperature, the time, the atmosphere, the pressure, the solid-to-liquid ratio, the mixing conditions (e.g., agitation speed) being used. As noted above, these parameters are selected to induce the chemical conversion and specific values generally depend upon the type of metal-containing material. Binoxalate/tetraoxalate types have been described above. Illustrative binoxalate/tetraoxalate concentrations in the leaching solution include those in a range of from 0.1 M to 2 M. The pH is acidic, e.g., less than 4, less than 3, in a range of from 1 to 3. Illustrative temperatures include those in a range of from room temperature (20° C. to 25° C.) to 130° C. Illustrative times include those in a range of from 1 hour to 24 hours. The atmosphere refers to digestion being carried out under either inert conditions, reductive conditions, or oxidative conditions. Inert conditions may be achieved by using an atmosphere of an inert gas (e.g., $N_2$). Reductive conditions may be achieved by using an atmosphere of a reducing gas (e.g., $H_2$). Oxidative conditions may be achieved by using an atmosphere of an oxidating gas (e.g., air, $O_2$). Reductive or oxidative conditions may also be achieved by use of a reducing or oxidizing agent in the leaching solution as noted above. Illustrative pressures used include atmospheric pressure to 10 bar. The solid-to-liquid ratio refers to the weight of the solid, metal-containing material to the volume of the leaching solution. In embodiments, this ratio is in a range of from 5 g/L to 25 g/L. Mixing can be accomplished by agitation under various speeds, e.g., from 100 to 1000 rpm.

Metal Recovery

After digestion of the metal-containing material, the present methods further involve recovery of the desired metals from the processed mixture. The leachate (liquid portion of the processed mixture) may be exposed to conditions sufficient to induce precipitation of the desired metal out of solution as a metal-containing precipitate. For example, metal hydroxide precipitation may be induced by adding an appropriate base to the leachate. The base generally depends upon the oxalate compound used. Specifically, it is desirable that the cation of the base is the same as the cation of the oxalate compound used. Hydroxide bases may be used. Ammonia ($NH_3$) may also be used. By way of illustration, if $KHC_2O_4$ is used as the oxalate compound, an appropriate base is KOH. Other conditions to induce precipitation include temperature, pH, and aging time. The temperature and pH may be selected to induce precipitation of a certain desired metal over another desired metal that may be present in the leachate. Thus, these conditions depend upon the composition of the leachate and the desired metal hydroxide to be precipitated. However, illustrative temperatures include those in a range of from room temperature to 40° C. Regarding pH, by way of illustration, for iron (Fe), the pH may be basic, e.g., greater than 11, greater than 12, greater than 14. Aging time refers to the time between digestion and precipitation. Illustrative aging times include those in a range of from 30 min to 12 hours. Additives may be added to the leachate to facilitate precipitation, e.g., seeding particles such as metal hydroxide particles.

When the leachate (liquid portion of the processed mixture) comprises more than one type of desired metal, recovery may involve the selective precipitation (e.g., metal hydroxide precipitation) of the desired metals by pH adjustment, wherein different desired metals precipitate out of solution at different pH values. In such a process, the pH value of the leachate is adjusted to a first value to induce precipitation of a first metal-containing precipitate; the pH value of the leachate is adjusted to a second, different value to induce precipitation of a second metal-containing precipitate; etc. The desired pH values may be obtained by adding an appropriate amount of base (see above) or acid (e.g., a mineral acid such as $H_2SO_4$, HCl, etc.). By way of illustration with reference to FIGS. 1-4, a base may be added to adjust the pH to basic conditions, e.g., greater than 11 to induce precipitation of iron hydroxide; and an acid may be added to lower the pH to induce precipitation of aluminum hydroxide. Again, the temperature may be selected to facilitate precipitation of the desired metal.

In another variation of selective precipitation of metal hydroxides by pH adjustment, a base (see above) may be added at a selected rate to adjust the pH from acidic to basic conditions. As shown in Table 1, different metals present in bauxite will precipitate out of solution as the corresponding metal hydroxide at different pH values. Again, the temperature may be selected to facilitate precipitation of the desired metal.

TABLE 1 pH for metal hydroxide precipitation.

| Metal | Starting pH | Ksp |
|---|---|---|
| $Al^{3+}$ | 3.2 | $1.3 \times 10^{-33}$ |
| $Fe^{3+}$ | 0.9 | $2.8 \times 10^{-39}$ |
| $Ti^{4+}$ | 0.5 | $7.1 \times 10^{-53}$ |
| $Zn^{2+}$ | 6.1 | $3.0 \times 10^{-17}$ |
| $Cr^{3+}$ | 6.0 | $1.6 \times 10^{-30}$ |

Figure 5:
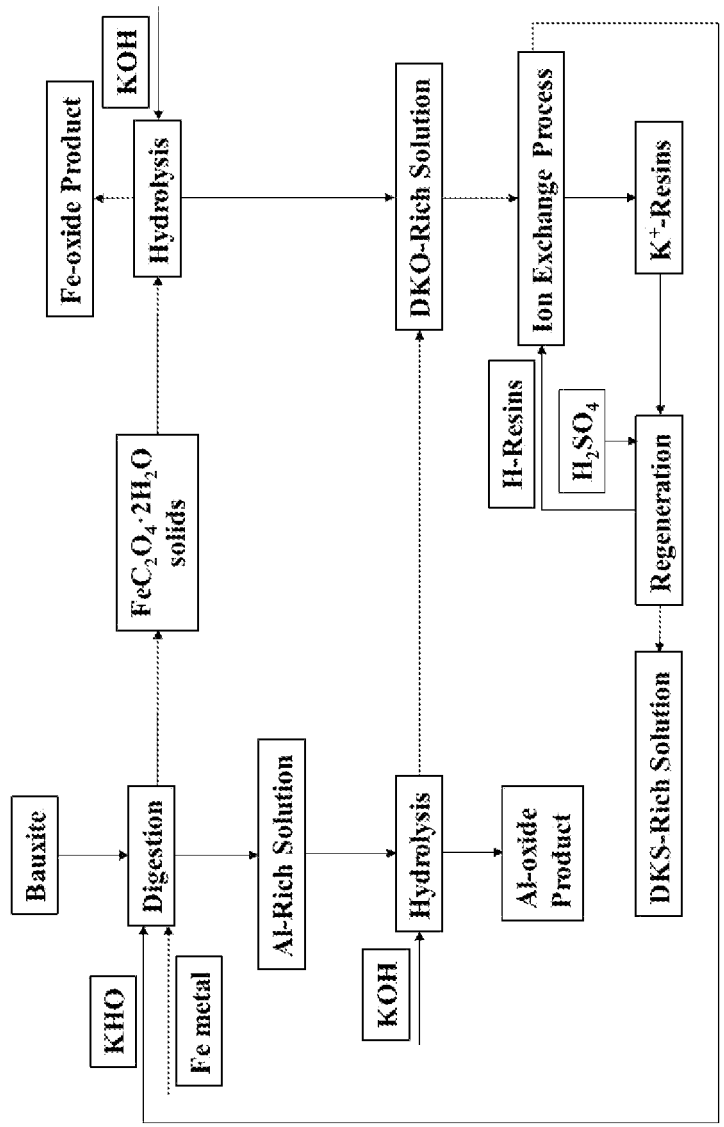
FIG. 5 is a flow-chart showing the recovery of iron (Fe) and aluminum (Al) from bauxite using $KHC_2O_4$, according to another illustrative embodiment of the present methods.

Another technique for metal recovery involves adding a reducing agent to the leaching solution or the leachate (the liquid portion of the processed mixture). By way of illustration, an amount of iron (Fe) metal may be added to the leachate to reduce $Fe^{3+}$ in solution to $Fe^{2+}$, which precipitates out of solution as an insoluble iron oxalate. As shown in FIG. 5, addition of such a reducing agent may take place at the same time as digestion (i.e., the reducing agent is added to the leaching solution) to provide an Al-rich leachate and insoluble $FeC_2O_4$ solids, which may be recovered, e.g., via filtration and further processed as described below.

Yet another technique for metal recovery involves adding certain extractants and organic solvents to the leachate (the liquid portion of the processed mixture). By way of illustration, $Ti^{4+}$ can be selectively extracted from an aqueous solution containing other metals like $Fe^{3+}$ and $Al^{3+}$, using Cyanex 301 (bis-(2,4,4-trimethylpentyl)dithiophosphinic acid) or Cyanex 302 (bis-(2,4,4-trimethylpentyl)monothiophosphinic acid). These extractants can be used in various organic solvents like toluene, cyclohexane, and kerosene. An organic phase prepared using the solvent and extractant may be mixed with the aqueous leachate. The contact time between both phases, concentration of extractant present in the organic phase, and pH are parameters which may be adjust to optimize $Ti^{4+}$ extraction. Regarding pH, extraction is particularly effective in the pH range where $Ti^{4+}$ exists in the form of $Ti(OH)_2^{2+}$. In such cases the formation of $Ti(OH)_2R_2$ occurs through a cation exchange process with the extractant. After extraction, Cyanex 301 or Cyanex 302 can be stripped using an acid like $H_2SO_4$ for $Ti^{4+}$ recovery, which can be further hydrolyzed into $Ti(OH)_4$ using an appropriate base.

Figure 2:
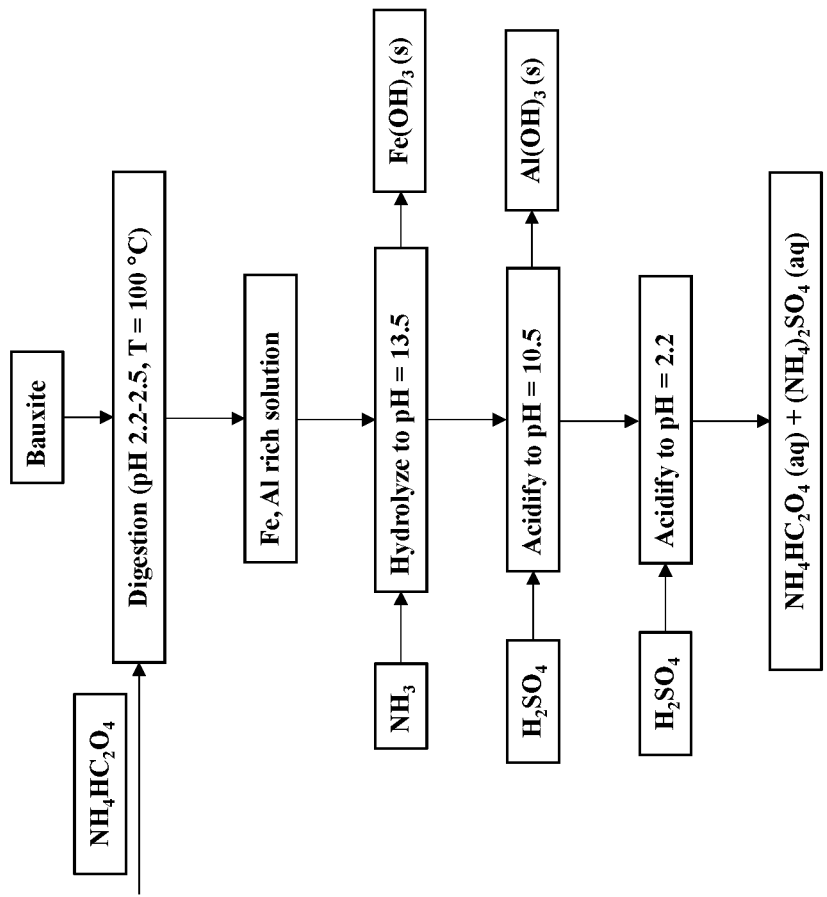
FIG. 2 is a flow-chart showing the recovery of iron (Fe) and aluminum (Al) from bauxite using $NH_4HC_2O_4$, according to another illustrative embodiment of the present methods.
Figure 3:
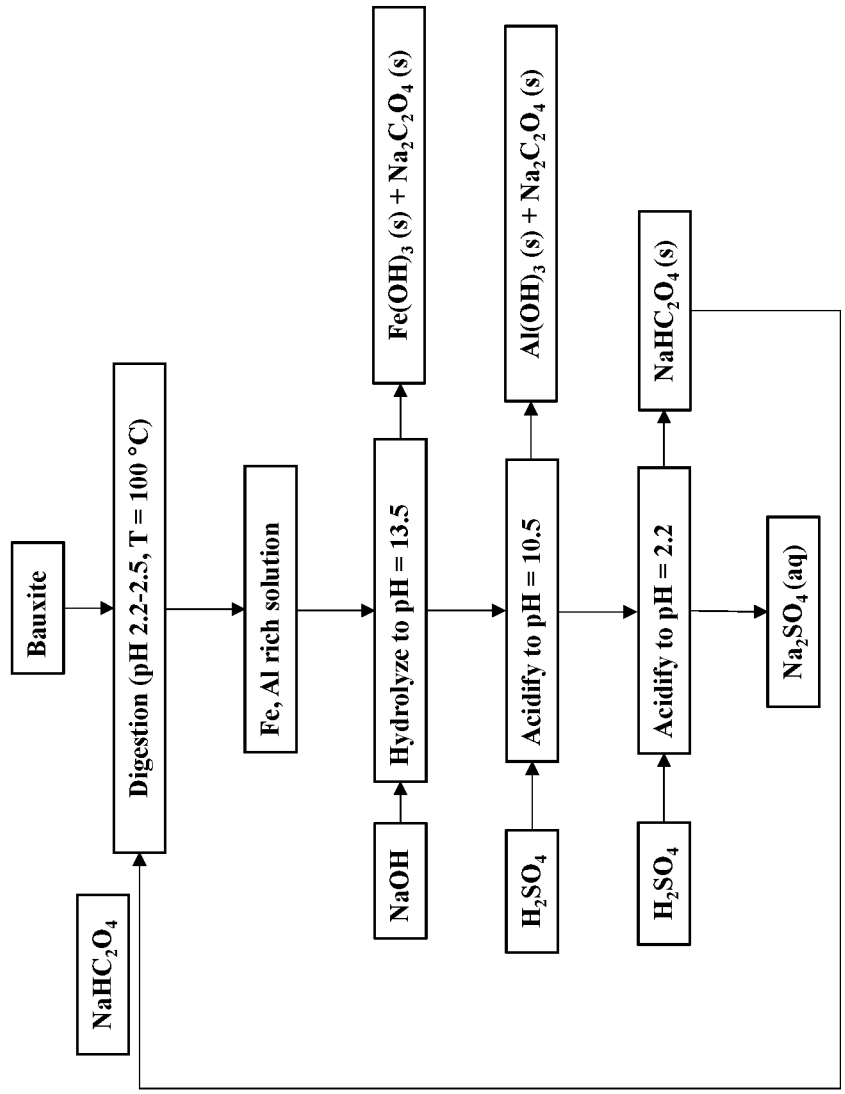
FIG. 3 is a flow-chart showing the recovery of iron (Fe) and aluminum (Al) from bauxite using $NaHC_2O_4$, according to another illustrative embodiment of the present methods.

However generated, metal-containing precipitates, e.g., metal hydroxides, may be recovered from the processed leachate, e.g., via filtration. As shown in FIGS. 1 and 2, the binoxalates $KHC_2O_4$ and $NH_4HC_2O_4$ enable the recovery of the precipitated metal hydroxides with high purity. As shown in FIG. 3, use of $NaHC_2O_4$ may result in a mixture of the metal hydroxide and sodium oxalate.

Referring back to FIG. 5, in which iron was extracted from bauxite in the digestion step as an insoluble iron oxalate, the solid can be recovered and a base added to convert the iron oxalate to an iron oxide, which may be recovered, e.g., via filtration.

Metal-containing precipitates, e.g., metal hydroxides, may then be calcined under appropriate conditions to form the corresponding oxides. By way of illustration, precipitated alumina hydrate may be calcined into $Al_2O_3$, which is a feedstock for the Hall-Héroult process for the production of aluminum. Metal hydroxides such as Fe and Ti may be converted into their metal oxides ($Fe_2O_3$ and $TiO_2$) via calcination. Structure directing agents such as $ZnCl_2$ may be added to control the crystalline phase (e.g., $TiO_2$ rutile versus anatase).

Binoxalate/Tetraoxalate Recovery

The present methods may further involve the recovery of the oxalate compound reagent, and if desired, recycling of the reagent by feeding it back into earlier steps, e.g., digestion. This forms a closed loop process which minimizes external inputs to the method. The term "recovered" may be used with respect to specific reagents when identifying them as having been recovered from a previous step of the method.

Figure 4:
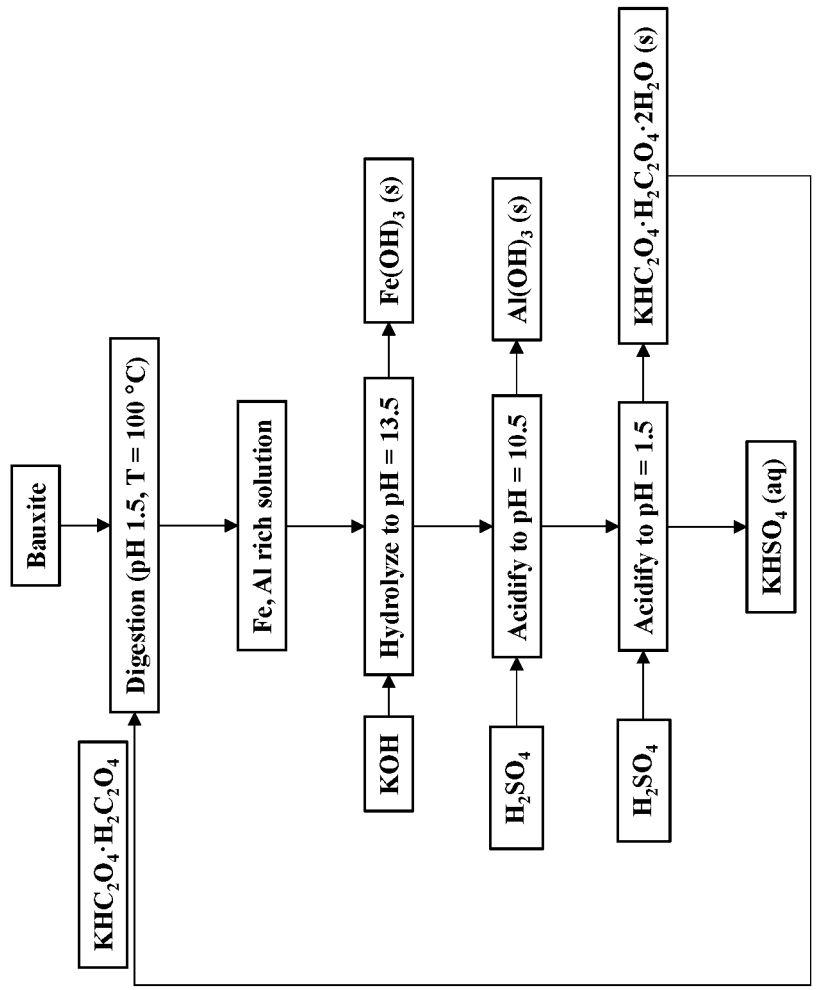
FIG. 4 is a flow-chart showing the recovery of iron (Fe) and aluminum (Al) from bauxite using $KHC_2O_4 \cdot H_2C_2O_4$, according to another illustrative embodiment of the present methods.

Recovery of the oxalate compound can depend upon the type of oxalate compound used, as well as conditions used in earlier steps. As shown in FIGS. 1, 3, and 4, after removal of desired metals, the pH of the processed leachate (or filtrate therefrom) is further adjusted (e.g., lowered) to induce precipitation of the oxalate compound, which may be recovered, e.g., by filtration, and fed back into a digestion step.

As shown in FIG. 2, pH adjustment of the processed leachate (or filtrate therefrom) may result in an aqueous mixture of the binoxalate with a sulfate.

As shown in FIG. 5, a processed leachate (or filtrate therefrom) may be rich in oxalates. As shown in this figure, alkali metal oxalate solutions (in FIG. 5, dipotassium oxalate, DKO) may be subjected to strong acid cationic resins (H-resins) so as to exchange alkali metal ions in the aqueous solutions for $H^+$ ions. The used ion exchange resin (in FIG. 5, $K^+$-resin) may be regenerated by exposure to an acid (e.g., $H_2SO_4$). Diammonium oxalate solutions may be subjected to crystallization of the diammonium oxalate, followed by thermal diammoniation to produce the ammonium binoxalate.

The present methods may further comprise repeating the initial digestion step of exposing the metal-containing material (e.g., a new batch of the metal-containing material) to recovered oxalate compound. This offers a closed loop process that is more efficient and cost-effective than existing methods.

EXAMPLES

Examples on Extraction of Iron and Aluminum Metal Using Potassium Binoxalate

Example 1A: Metal Extraction Experiment at 0.75 M Potassium Binoxalate

In a 1000 ml Ace Glass reactor flask were charged 6 g NIST SRM 600 Bauxite ore (CAS Number [1318-16-7]), 18.91 g $H_2C_2O_4 \cdot 2H_2O$ (Sigma Aldrich reagent grade oxalic acid dihydrate, Catalog Number 247537, CAS Number [6153-56-6]), 27.64 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 400 g deionized water. The solid-to-liquid ratio of this mixture was 15 g/L and the concentration of potassium binoxalate in aqueous solution was 0.75 M. The flask was connected to a Duran style head with a stirring rod and temperature controllers enclosed in a heating jacket. The reactor was stirred at 600 rpm and heated from 20° C. to 98° C. and held at the temperature for 8 h before allowing to cool. Under these conditions, oxalic acid and potassium oxalate monohydrate react to form potassium binoxalate. After cooling down, reactor was disassembled, and filtration was performed using a 11 μm cellulose filter. During filtration, residue was washed with deionized water. Later, residue was kept for drying overnight and obtained a total mass of 1.11 g. PXRD of solids recovered matches exactly to quartz ($SiO_2$) indicating essentially complete dissolution of Fe and Al.

Example 1B: Metal Extraction Experiment at 0.50 M Potassium Binoxalate

In a 1000 ml Ace Glass reactor flask were charged 6 g NIST SRM 600 Bauxite ore (CAS Number [1318-16-7]), 12.60 g $H_2C_2O_4 \cdot 2H_2O$ (Sigma Aldrich reagent grade oxalic acid dihydrate, Catalog Number 247537, CAS Number [6153-56-6]), 18.42 g $K_2C_2O_4 \cdot H_2O$ (Alfa Aesar™ Potassium oxalate monohydrate, ACS, 98.8-101.0%, Catalog Number AA1345236, CAS Number [6487-48-51]) and 400 g deionized water. The solid-to-liquid ratio of this mixture was 15 g/L and the concentration of oxalate in aqueous solution was 0.50 M. The flask was connected to a Duran style head with a stirring rod and temperature controllers enclosed in a heating jacket. The reactor was stirred at 600 rpm and heated from 20° C. to 98° C. and held at the temperature for 8 h before allowing to cool. Under these conditions, oxalic acid and potassium oxalate monohydrate react to form potassium binoxalate. After cooling down, reactor was disassembled, and filtration was performed using a 11 μm cellulose filter. During filtration, residue was washed with deionized water. Later, residue was kept for drying overnight and obtained a total mass of 1.12 g. PXRD of solids recovered matches exactly to quartz ($SiO_2$) indicating essentially complete dissolution of Fe and Al.

Example 1C: Metal Extraction Experiment at 0.25 M Potassium Tetraoxalate

In a 1000 ml Ace Glass reactor flask were charged 6 g NIST SRM 600 Bauxite ore (CAS Number [1318-16-71]), 18.91 g $H_2C_2O_4 \cdot 2H_2O$ (Sigma Aldrich reagent grade oxalic acid dihydrate, Catalog Number 247537, CAS Number [6153-56-61]), 9.21 g $K_2C_2O_4 \cdot H_2O$ (Alfa Aesar™ Potassium oxalate monohydrate, ACS, 98.8-101.0%, Catalog Number AA1345236, CAS Number [6487-48-51]) and 400 g deionized water. The solid-to-liquid ratio of this mixture was 15 g/L and the concentration of oxalate in aqueous solution was 0.50 M. The flask was connected to a Duran style head with a stirring rod and temperature controllers enclosed in a heating jacket. The reactor was stirred at 600 rpm and heated from 20° C. to 98° C. and held at the temperature for 8 h before allowing to cool. Under these conditions, oxalic acid and potassium oxalate monohydrate react to form potassium tetraoxalate. After cooling down, reactor was disassembled, and filtration was performed using a 11 μm cellulose filter. During filtration, residue was washed with deionized water. Later, residue was kept for drying overnight and obtained a total mass of 1.01 g. PXRD of solids recovered matches exactly to quartz ($SiO_2$) indicating essentially complete dissolution of Fe and Al.

Example 1D: Metal Extraction Experiment at 0.25 M Potassium Tetraoxalate

In a 1000 ml Ace Glass reactor flask were charged 8 g NIST SRM 600 Bauxite ore (CAS Number [1318-16-71]), 18.91 g $H_2C_2O_4 \cdot 2H_2O$ (Sigma Aldrich reagent grade oxalic acid dihydrate, Catalog Number 247537, CAS Number [6153-56-61]), 9.21 g $K_2C_2O_4 \cdot H_2O$ (Alfa Aesar™ Potassium oxalate monohydrate, ACS, 98.8-101.0%, Catalog Number AA1345236, CAS Number [6487-48-51]) and 400 g deionized water. The solid-to-liquid ratio of this mixture was 20 g/L and the concentration of oxalate in aqueous solution was 0.50 M.

The flask was connected to a Duran style head with a stirring rod and temperature controllers enclosed in a heating jacket. The reactor was stirred at 600 rpm and heated from 20° C. to 98° C. and held at the temperature for 6 h before allowing to cool. Under these conditions, oxalic acid and potassium oxalate monohydrate react to form potassium tetraoxalate. After cooling down, reactor was disassembled, and filtration was performed using a 11 μm cellulose filter. During filtration, residue was washed with deionized water. Later, residue was kept for drying overnight and obtained a total mass of 1.34 g. PXRD of solids recovered matches exactly to quartz ($SiO_2$) indicating essentially complete dissolution of Fe and Al.

Example 1E: Metal Extraction Experiment at 0.75 M Potassium Binoxalate

In a 1000 ml Ace Glass reactor flask were charged 3.30 g Bayerite (Alcoa C-37), 2.73 g Bayferrox® 512z (CAS Number [1309-37-1]), 18.91 g $H_2C_2O_4 \cdot 2H_2O$ (Sigma Aldrich reagent grade oxalic acid dihydrate, Catalog Number 247537, CAS Number [6153-56-6]), 27.63 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 400 g deionized water. The solid-to-liquid ratio of this mixture was 15 g/L and the concentration of oxalate in aqueous solution was 0.75 M. The flask was connected to a Duran style head with a stirring rod and temperature controllers enclosed in a heating jacket. The reactor was stirred at 600 rpm and heated from 20° C. to 98° C. and held at the temperature for 8 h before allowing to cool. Under these conditions, oxalic acid and potassium oxalate monohydrate react to form potassium binoxalate. After cooling down, reactor was disassembled, and filtration was performed using a 11 μm cellulose filter. No residue was recovered, and a clear green filtrate was obtained indicating complete dissolution of Fe and Al.

Example 1F: Metal Extraction Experiment at 0.50 M Potassium Binoxalate

In a 1000 ml Ace Glass reactor flask were charged 6 g Bauxite ore (Sargent-Welch, 170 mesh, Al 41%, Fe 5%, Si 3%), 12.60 g $H_2C_2O_4 \cdot 2H_2O$ (Sigma Aldrich reagent grade oxalic acid dihydrate, Catalog Number 247537, CAS Number [6153-56-6]), 18.42 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 400 g deionized water. The solid-to-liquid ratio of this mixture was 15 g/L and the concentration of oxalate in aqueous solution was 0.50 M. The flask was connected to a Duran style head with a stirring rod and temperature controllers enclosed in a heating jacket. The reactor was stirred at 600 rpm and heated from 20° C. to 98° C. and held at the temperature for 8 h before allowing to cool. Under these conditions, oxalic acid and potassium oxalate monohydrate react to form potassium binoxalate. After cooling down, reactor was disassembled, and filtration was performed using a 11 μm cellulose filter. During filtration, residue was washed with deionized water. Later, residue was kept for drying overnight and obtained a total mass of 1.32 g. The residue was digested in aqua regia and analyzed using ICP. The ICP analysis indicates 85% Al and 42% Fe extraction in the aqueous phase.

Example 1G: Metal Extraction Experiment at 0.75 M Potassium Binoxalate

In a 1000 ml Ace Glass reactor flask were charged 6 g Bauxite ore (Sargent-Welch, 170 mesh, Al 41%, Fe 5% and Si 3%), 18.90 g $H_2C_2O_4 \cdot 2H_2O$ (Sigma Aldrich reagent grade oxalic acid dihydrate, Catalog Number 247537, CAS Number [6153-56-6]), 27.30 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 400 g deionized water. The solid-to-liquid ratio of this mixture was 15 g/L and the concentration of oxalate in aqueous solution was 0.75 M. The flask was connected to a Duran style head with a stirring rod and temperature controllers enclosed in a heating jacket. The reactor was stirred at 600 rpm and heated from 20° C. to 98° C. and held at the temperature for 8 h before allowing to cool. Under these conditions, oxalic acid and potassium oxalate monohydrate react to form potassium binoxalate. After cooling down, reactor was disassembled, and filtration was performed using a 11 μm cellulose filter. During filtration, residue was washed with deionized water. Later, residue was kept for drying overnight and obtained a total mass of 0.86 g. The residue was digested in aqua regia and analyzed using ICP. The ICP analysis indicates 90% Al and 75% Fe extraction in the aqueous phase.

Example 1H: Metal Extraction Experiment at 0.75 M Potassium Binoxalate

In a 1000 ml Ace Glass reactor flask were charged 6 g Bauxite ore (Sargent-Welch, 170 mesh, Al 41%, Fe 5% and Si 3%), 18.91 g $H_2C_2O_4 \cdot 2H_2O$ (Sigma Aldrich reagent grade oxalic acid dihydrate, Catalog Number 247537, CAS Number [6153-56-6]), 27.31 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 400 g deionized water. The solid-to-liquid ratio of this mixture was 15 g/L and the concentration of oxalate in aqueous solution was 0.75 M. The flask was connected to a Duran style head with a stirring rod and temperature controllers enclosed in a heating jacket. The reactor was stirred at 600 rpm and heated from 20° C. to 98° C. and held at the temperature for 24 h before allowing to cool. Under these conditions, oxalic acid and potassium oxalate monohydrate react to form potassium binoxalate. After cooling down, reactor was disassembled, and filtration was performed using a 11 μm cellulose filter. During filtration, residue was washed with deionized water. Later, residue was kept for drying overnight and obtained a total mass of 0.69 g. The residue was digested in aqua regia and analyzed using ICP. The ICP analysis indicates 94% Al and 86% Fe extraction in the aqueous phase.

Examples of Metal Extraction Experiments and Precipitation Studies on Small-Scale Example 2A: Aluminum Extraction Experiment from Bayerite ($Al(OH)_3$) at 0.75 M Potassium Binoxalate In a 20 ml glass vial were charged 154 mg of bayerite, 486 mg $H_2C_2O_4 \cdot 2H_2O$ (Sigma Aldrich reagent grade oxalic acid dihydrate, Catalog Number 247537, CAS Number [6153-56-6]), 718 mg $K_2C_2O_4 \cdot H_2O$ (Alfa Aesar™ Potassium oxalate monohydrate, ACS, 98.8-101.0%, Catalog Number AA1345236, CAS Number [6487-48-5]) and 10.7 g deionized water. The solid-to-liquid ratio of this mixture was 15 g/L and the concentration of oxalate in aqueous solution was 0.75 M. The vial was stirred on a magnetic stirring and heating plate at 500 rpm and heated from 20° C. to 80° C. and held at the temperature for 3 h before allowing to cool. Under these conditions, oxalic acid and potassium oxalate monohydrate react to form potassium binoxalate. After cooling down, filtration was performed using a 11 μm cellulose filter. During filtration, residue was washed with deionized water. Later, residue was kept for drying overnight and obtained a total mass of 21 mg. PXRD of solids recovered matches to the starting material. Together the mass recovered and PXRD data indicates 86% of aluminum extraction.

Example 2B: Aluminum Extraction Experiment from Boehmite (AlO(OH)) at 0.75 M Potassium Binoxalate In a 20 ml glass vial were charged 153 mg of boehmite, 472 mg $H_2C_2O_4 \cdot 2H_2O$ (Sigma Aldrich reagent grade oxalic acid dihydrate, Catalog Number 247537, CAS Number [6153-56-6]), 728 mg $K_2C_2O_4 \cdot H_2O$ (Alfa Aesar™ Potassium oxalate monohydrate, ACS, 98.8-101.0%, Catalog Number AA1345236, CAS Number [6487-48-5]) and 10.5 g deionized water. The solid-to-liquid ratio of this mixture was 15 g/L and the concentration of oxalate in aqueous solution was 0.75 M. The vial was stirred on a magnetic stirring and heating plate at 500 rpm and heated from 20° C. to 80° C. and held at the temperature for 3 h before allowing to cool. Under these conditions, oxalic acid and potassium oxalate monohydrate react to form potassium binoxalate. After cooling down, filtration was performed using a 11 μm cellulose filter. During filtration, residue was washed with deionized water. Later, residue was kept for drying overnight and obtained a total mass of 39 mg. PXRD of solids recovered matches to the starting material. Together the mass recovered and PXRD data indicates 74% of aluminum extraction.

Example 2C: Iron Extraction Experiment from Hematite ($Fe_2O_3$) at 0.75 M Potassium Binoxalate In a 20 ml glass vial were charged 157 mg of Bayferrox® 512z (CAS Number [1309-37-1]), 476 mg $H_2C_2O_4 \cdot 2H_2O$ (Sigma Aldrich reagent grade oxalic acid dihydrate, Catalog Number 247537, CAS Number [6153-56-6]), 747 mg $K_2C_2O_4 \cdot H_2O$ (Alfa Aesar™ Potassium oxalate monohydrate, ACS, 98.8-101.0%, Catalog Number AA1345236, CAS Number [6487-48-5]) and 10.2 g deionized water. The solid-to-liquid ratio of this mixture was 15 g/L and the concentration of oxalate in aqueous solution was 0.75 M. The vial was stirred on a magnetic stirring and heating plate at 500 rpm and heated from 20° C. to 80° C. and held at the temperature for 3 h before allowing to cool. Under these conditions, oxalic acid and potassium oxalate monohydrate react to form potassium binoxalate. After cooling down, filtration was performed using a 11 μm cellulose filter. During filtration, residue was washed with deionized water. Later, residue was kept for drying overnight and obtained a total mass of 20 mg. PXRD of solids recovered matches to the starting material. Together the mass recovered and PXRD data indicates 86% of iron extraction. The exact experiment was duplicated to generate additional filtrate for further analysis.

Example 2D: Alumina Precipitation from Filtrate of Example 2A Using KOH

In a 20 ml glass vial, filtrate from Example 2A was taken and charged with 0.38 g of KOH (Alfa Aesar™, Catalog Number A18854, CAS Number [1310-58-3]). The mixture was stirred at 500 rpm for 15 minutes and pH of the aqueous phase increased from 2.85 to 10.14. To separate the solid and aqueous phase, the mixture was centrifuged at 2500 rpm for 5 minutes. The aqueous phase at the top was clear in color and a white gel-like solid phase was settled at the bottom. In the aqueous phase, 88 ppm of Al was present indicating a 98% efficient precipitation.

Example 2E: Ferric Hydroxide Precipitation from Filtrate of Example 2C Using KOH In a 20 ml glass vial, green filtrate from Example 2C was taken and charged with 0.14 g of KOH (Alfa Aesar™, Catalog Number A18854, CAS Number [1310-58-3]). The mixture was stirred at 500 rpm for 15 minutes and pH of the aqueous phase increased from 2.85 to 7.79. To separate the solid and aqueous phase, the mixture was centrifuged at 2500 rpm for 5 minutes. The aqueous phase at the top was light green in color and a dark orange gel-like solid phase was settled at the bottom. The light green phase was separated and was charged with 0.23 g of KOH (Alfa Aesar™, Catalog Number A18854, CAS Number [1310-58-3]). The mixture was stirred at 500 rpm for 15 minutes and pH of the aqueous phase increased from 7.79 to 13.7. To separate the solid and aqueous phase, the mixture was centrifuged again at 2500 rpm for 5 minutes. The aqueous phase at the top was clear in color and a dark orange gel-like solid phase was settled at the bottom. In the aqueous phase, 0.30 ppm of Fe was present indicating a 99.99% efficient precipitation.

Example 2F: Ferric Hydroxide Precipitation from Filtrate of Example 2C Using Iron Metal Powder In a 20 ml glass vial, green filtrate from Example 2C was taken and charged with 0.067 g of iron metal powder (Alfa Aesar™, Catalog Number 525370, CAS Number [7439-89-6]). The mixture was stirred at 500 rpm for 15 hours and a yellow precipitate was observed. To separate the yellow solid and light-yellow aqueous phase, filtration was performed using a 11 μm cellulose filter. During filtration, residue was washed with deionized water. Later, residue was kept for drying overnight and obtained a total mass of 0.47 g. The precipitate recovered was identified as $FeC_2O_4 \cdot 2H_2O$ (ferrous oxalate dihydrate) using PXRD. The aqueous phase had a remaining iron concentration of 1487 ppm with no iron metal powder left.

Examples on Regeneration of Potassium Binoxalate and Potassium Tetraoxalate Dihydrate Example 3A: Regeneration of Potassium Binoxalate from a Model Solution Using Sulfuric Acid In an 80 ml glass bottle were charged 3.77 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 20 g deionized water. The mixture was stirred for 10 minutes at 450 rpm on a magnetic stir plate. In the resulting solution, 0.13 g of KOH (Alfa Aesar™ Catalog Number A18854, CAS Number [1310-58-3]) was added to prepare a solution of pH 13.43. In the model solution, 1.29 g of 98% sulfuric acid (Fisher Scientific, Catalog Number A300500, CAS Number [7664-93-9]) was added and pH decreased to 2.14. The glass bottle was stirred at 450 rpm for 1 h. After 1 h, filtration was performed using an 11 μm cellulose filter and 1.62 g of white precipitate was recovered. The residue was washed with 10 g deionized water. The white precipitate recovered was identified as $KHC_2O_4$ (potassium binoxalate) using PXRD.

Example 3B: Regeneration of Potassium Tetraoxalate Dihydrate from a Model Solution Using Sulfuric Acid In an 80 ml glass bottle were charged 3.77 g $K_2C_2O_4 \cdot H_2O$ (Alfa Aesar™ potassium oxalate monohydrate, ACS, 98.8-101.0%, Catalog Number AA1345236, CAS Number [6487-48-5]) and 20 g deionized water. The mixture was stirred for 10 minutes at 450 rpm on a magnetic stir plate. In the resulting solution, 0.14 g of KOH (Alfa Aesar™ Catalog Number A18854, CAS Number [1310-58-3]) was added to prepare a model solution of pH 13.55. In the model solution, 2.08 g of 98% sulfuric acid (Fisher Scientific, Catalog Number A300500, CAS Number [7664-93-9]) was added and pH decreased to 1.32. The glass bottle was stirred at 450 rpm for 1 h. After 1 h, filtration was performed using an 11 μm cellulose filter and 2.20 g of white precipitate was recovered. The residue was washed with 10 g deionized water. The white precipitate recovered was identified as $KHC_2O_4 \cdot H_2C_2O_4 \cdot 2H_2O$ (potassium tetraoxalate dihydrate) using PXRD.

Example 3C: Regeneration of Potassium Binoxalate from a Model Solution Using Hydrochloric Acid In an 80 ml glass bottle were charged 3.77 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 20 g deionized water. The mixture was stirred for 10 minutes at 450 rpm on a magnetic stir plate. In the resulting solution, 0.12 g of KOH (Alfa Aesar™ Catalog Number A18854, CAS Number [1310-58-3]) was added to prepare a model solution of pH 13.40. In the model solution, 1.78 g of 37% hydrochloric acid (ACS Reagent, Catalog Number 258148, CAS Number [7647-01-0]) was added and pH decreased to 3.63. The glass bottle was stirred at 450 rpm for 1 h. After 1 h, filtration was performed using an 11 μm cellulose filter and 1.51 g of white precipitate was recovered. The residue was washed with 10 g deionized water. The white precipitate recovered was identified as $KHC_2O_4 \cdot H_2O$ (potassium binoxalate monohydrate) using PXRD. The filtrate was charged with an additional 1.08 g of 37% hydrochloric acid (ACS Reagent, Catalog Number 258148, CAS Number [7647-01-0]) and pH decreased to 0.87. The glass bottle was stirred at 450 rpm for 1 h. After 1 h, filtration was performed using an 11 μm cellulose filter and 0.72 g of white precipitate was recovered. The residue was washed with 10 g deionized water. The white precipitate recovered was identified as $KHC_2O_4 \cdot H_2C_2O_4 \cdot 2H_2O$ (potassium tetraoxalate dihydrate) using PXRD.

Example 3D: Regeneration of Potassium Tetraoxalate Dihydrate from a Model Solution Using Hydrochloric Acid with a Method for Determination of Unrecovered Oxalate In an 80 ml glass bottle were charged 3.77 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 20 g deionized water. The mixture was stirred for 10 minutes at 450 rpm on a magnetic stir plate. In the resulting solution, 0.12 g of KOH (Alfa Aesar™ Catalog Number A18854, CAS Number [1310-58-3]) was added to prepare a model solution of pH 13.46. In the model solution, 3.53 g of 37% hydrochloric acid (ACS Reagent, Catalog Number 258148, CAS Number [7647-01-0]) was added and pH decreased to 0.75. The glass bottle was stirred at 450 rpm for 1 h. After 1 h, filtration was performed using an 11 μm cellulose filter and 2.28 g of white precipitate was recovered. The residue was washed with 10 g deionized water. The white precipitate recovered was identified as $KHC_2O_4 \cdot H_2C_2O_4 \cdot 2H_2O$ (potassium tetraoxalate dihydrate) using PXRD. The filtrate was charged with 0.70 g of $CaCl_2 \cdot 2H_2O$ (ACS Reagent, Catalog Number 223506, CAS Number [10035-04-8]) and was stirred at 450 rpm for 1 h. After 1 h, filtration was performed using an 11 μm cellulose filter and 0.30 g of white precipitate was recovered. The residue was washed with 10 g deionized water. The white precipitate recovered was identified as $CaC_2O_4 \cdot 2H_2O$ (calcium oxalate dihydrate) using PXRD. Approximately, 84% of oxalate was recovered initially in $KHC_2O_4 \cdot H_2C_2O_4 \cdot 2H_2O$ and remaining 16% of oxalate was recovered in $CaC_2O_4 \cdot 2H_2O$.

Example 3E: Regeneration of Potassium Tetraoxalate Dihydrate from a Model Solution Using Sulfuric Acid with a Method for Determination of Unrecovered Oxalate In an 80 ml glass bottle were charged 3.77 g $K_2C_2O_4 \cdot H_2O$ (Alfa Aesar™ Potassium oxalate monohydrate, ACS, 98.8-101.0%, Catalog Number AA1345236, CAS Number [6487-48-5]) and 20 g deionized water. The mixture was stirred for 10 minutes at 450 rpm on a magnetic stir plate. In the resulting solution, 0.09 g of KOH (Alfa Aesar™ Catalog Number A18854, CAS Number [1310-58-3]) was added to prepare a model solution of pH 13.29. In the model solution, 2.04 g of 98% sulfuric acid (Fisher Scientific, Catalog Number A300500, CAS Number [7664-93-9]) was added and pH decreased to 1.29. The glass bottle was stirred at 450 rpm for 1 h. After 1 h, filtration was performed using an 11 μm cellulose filter and 2.06 g of white precipitate was recovered. The residue was washed with 10 g deionized water. The white precipitate recovered was identified as $KHC_2O_4 \cdot H_2C_2O_4 \cdot 2H_2O$ (potassium tetraoxalate dihydrate) using PXRD. The filtrate was charged with 1.19 g of $CuSO_4 \cdot 5H_2O$ (ACS Reagent, Catalog Number 209198, CAS Number [7758-99-8]) and was stirred at 450 rpm for 1 h. After 1 h, filtration was performed using an 11 μm cellulose filter and 0.36 g of aqua green precipitate was recovered. The residue was washed with 10 g deionized water. The precipitate recovered was identified as $CuC_2O_4 \cdot H_2O$ (copper oxalate monohydrate) using PXRD. Approximately, 79% of oxalate was recovered initially in $KHC_2O_4 \cdot H_2C_2O_4 \cdot 2H_2O$ and remaining 21% of oxalate was recovered in $CuC_2O_4 \cdot H_2O$.

Comparative Examples Between Ammonium Binoxalate, Sodium Binoxalate and Potassium Binoxalate Example 4A: Synthesis of Ammonium Binoxalate In a 20 ml glass vial were charged 0.80 g $(NH_4)_2C_2O_4 \cdot H_2O$ (Acros Organics ammonium oxalate monohydrate, Catalog Number AC206270010, CAS Number [6009-70-7]), 0.71 g $H_2C_2O_4 \cdot 2H_2O$ (Sigma Aldrich reagent grade oxalic acid dihydrate, Catalog Number 247537, CAS Number [6153-56-6]) and 15.3 g deionized water. The concentration of oxalic acid was 0.375 M. The molar ratio of $(NH_4)_2C_2O_4 \cdot H_2O$ and $H_2C_2O_4 \cdot 2H_2O$ was 1:1. The mixture was stirred for 30 minutes at 450 rpm on a magnetic stir plate and resulted in a clear solution. Under these conditions, $H_2C_2O_4 \cdot 2H_2O$ and $(NH_4)_2C_2O_4 \cdot H_2O$ react to form ammonium binoxalate. No precipitate observation indicates the formation of a soluble ammonium binoxalate under specified conditions.

Example 4B: Synthesis of Potassium Binoxalate

In a 20 ml glass vial were charged 1.04 g $K_2C_2O_4 \cdot H_2O$ (Alfa Aesar™ Potassium oxalate monohydrate, ACS, 98.8-101.0%, Catalog Number AA1345236, CAS Number [6487-48-5]), 0.71 g $H_2C_2O_4 \cdot 2H_2O$ (Sigma Aldrich reagent grade oxalic acid dihydrate, Catalog Number 247537, CAS Number [6153-56-6]) and 15.1 g deionized water. The concentration of oxalic acid was 0.375 M. The molar ratio of $K_2C_2O_4 \cdot H_2O$ and $H_2C_2O_4 \cdot 2H_2O$ was 1:1. The mixture was stirred for 30 minutes at 450 rpm on a magnetic stir plate. After 30 minutes, filtration was performed using an 11 μm cellulose filter and 0.41 g of white precipitate was recovered. The precipitate recovered was identified as $KHC_2O_4$ (potassium binoxalate) using PXRD.

Example 4C: Synthesis of Sodium Binoxalate

In a 20 ml glass vial were charged 0.75 g $Na_2C_2O_4$ (Alfa Aesar™ sodium oxalate, 99%, Catalog Number AAA1164822, CAS Number [62-76-0]) and 15.1 g deionized water. $Na_2C_2O_4$ remained insoluble after stirring for 30 minutes at 450 rpm and 20° C. on a magnetic stirring and heating plate. To dissolve the remaining $Na_2C_2O_4$, temperature of heating plate was increased to 70° C. The clear solution after cooling down was charged with 0.71 g $H_2C_2O_4 \cdot 2H_2O$ (Sigma Aldrich reagent grade oxalic acid dihydrate, Catalog Number 247537, CAS Number [6153-56-6]). The concentration of oxalic acid was 0.375 M and the molar ratio of $Na_2C_2O_4 \cdot H_2O$ and $H_2C_2O_4 \cdot 2H_2O$ was 1:1. The mixture was stirred for 30 minutes at 450 rpm on a magnetic stir plate. After 30 minutes, filtration was performed using an 11 μm cellulose filter and 1.05 g of white precipitate was recovered. The precipitate recovered was identified as $NaHC_2O_4 \cdot H_2O$ (sodium binoxalate monohydrate) using PXRD.

Example 4D: Synthesis of Potassium Tetraoxalate

In a 20 ml glass vial were charged 1.26 g $K_2C_2O_4 \cdot H_2O$ (Alfa Aesar™ Potassium oxalate monohydrate, ACS, 98.8-101.0%, Catalog Number AA1345236, CAS Number [6487-48-5]), 2.58 g $H_2C_2O_4 \cdot 2H_2O$ (Sigma Aldrich reagent grade oxalic acid dihydrate, Catalog Number 247537, CAS Number [6153-56-6]) and 20.63 g deionized water. The concentration of oxalic acid was 0.99 M. The molar ratio of $K_2C_2O_4 \cdot H_2O$ and $H_2C_2O_4 \cdot 2H_2O$ was 1:3. The mixture was stirred for 30 minutes at 450 rpm on a magnetic stir plate. After 30 minutes, filtration was performed using an 11 μm cellulose filter and 2.96 g of white precipitate was recovered. The precipitate recovered was identified as $KHC_2O_4 \cdot H_2C_2O_4 \cdot 2H_2O$ (potassium tetraoxalate dihydrate) using PXRD.

Example 4E: Sodium Binoxalate and Sodium Oxalate

Example 4C was repeated with no filtration performed to keep both aqueous and solid phase together. To the slurry, 0.68 g of NaOH (Alfa Aesar™, Catalog Number A16037, CAS Number [1310-73-2]) was added. On stirring the mixture at 450 rpm for 30 minutes, pH increased from 2.35 to 13.48. After 30 minutes, filtration was performed using an 11 μm cellulose filter and 0.91 g of white precipitate was recovered. The residue was washed with 10 g deionized water. The white precipitated recovered was identified as $Na_2C_2O_4$ (sodium oxalate) using PXRD.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for recovering a metal from a metal-containing material, the method comprising:
   (a) exposing a metal-containing material to a leaching solution comprising a solvent and a binoxalate, a tetraoxalate, or a combination thereof, under conditions to provide a leachate comprising a soluble metal oxalate;
   (b) inducing precipitation of a metal-containing precipitate comprising the metal of the soluble metal oxalate from the leachate; and
   (c) recovering the metal-containing precipitate,
   wherein the metal-containing material is bauxite.

2. The method of claim 1, wherein the binoxalate has formula $AHC_2O_4$ and the tetraoxalate has formula $AHC_2O_4 \cdot H_2C_2O_4$, wherein A is an ammonium cation, $NR_4$, wherein each R is independently selected from a group consisting of hydrogen and an alkyl group; or A is an alkali metal cation.

3. The method of claim 2, wherein A is the ammonium cation and at least one R is not hydrogen.

4. The method of claim 2, wherein the leaching solution comprises the binoxalate and the binoxalate is not $NH_4HC_2O_4$.

5. The method of claim 1, wherein the binoxalate has formula $AHC_2O_4$ and the tetraoxalate has formula $AHC_2O_4 \cdot H_2C_2O_4$, wherein A is an alkali metal cation.

6. The method of claim 5, wherein the binoxalate is $KHC_2O_4$, $NaHC_2O_4$, or a combination thereof and the tetraoxalate is $KHC_2O_4 \cdot H_2C_2O_4$.

7. The method of claim 1, wherein at least two metals of the metal-containing material to be recovered are each present in the leachate as respective soluble metal oxalates.

8. The method of claim 1, further comprising:
   (d) inducing precipitation of a second metal-containing precipitate from the leachate comprising a second soluble metal oxalate, the second metal-containing precipitate comprising the metal of the second soluble metal oxalate; and
   (e) recovering the second metal-containing precipitate.

9. The method of claim 8, wherein the metal-containing precipitate precipitates out of the leachate at a first pH value and step (d) comprises adjusting the pH of the leachate to a second pH value to induce precipitation of the second metal-containing precipitate.

10. The method of claim 1, further comprising recovering the binoxalate, the tetraoxalate, or the combination thereof, from the leachate.

11. The method of claim 10, wherein the binoxalate, the tetraoxalate, or the combination thereof, is recovered by adjusting the leachate's pH to induce precipitation of the binoxalate, the tetraoxalate, or the combination thereof.

12. A method for recovering a metal from bauxite, the method comprising:
   (a) exposing bauxite to a leaching solution comprising a solvent and a binoxalate, a tetraoxalate, or a combination thereof, under conditions to provide a leachate comprising a Fe soluble metal oxalate and an Al soluble metal oxalate;
   (b) inducing precipitation of a Fe-containing precipitate from the leachate by adjusting the leachate's pH to a first value;
   (c) recovering the Fe-containing precipitate;
   (d) inducing precipitation of an Al-containing precipitate from the leachate by adjusting the leachate's pH to a second value; and
   (e) recovering the Al-containing precipitate.

13. The method of claim 12, further comprising recovering the binoxalate, the tetraoxalate, or the combination thereof from the leachate.

14. The method of claim 12, wherein the binoxalate has formula $AHC_2O_4$, wherein A is an ammonium cation, $NR_4$, wherein each R is independently selected from a group consisting of hydrogen and an alkyl group; or A is an alkali metal cation.

15. The method of claim 12, wherein the binoxalate has formula $AHC_2O_4$ and the tetraoxalate has formula $AHC_2O_4 \cdot H_2C_2O_4$, wherein A is an alkali metal cation.

16. The method of claim 15, wherein the binoxalate is $KHC_2O_4$, $NaHC_2O_4$, or a combination thereof and the tetraoxalate is $KHC_2O_4 \cdot H_2C_2O_4$.

17. The method of claim 15, wherein the binoxalate is $KHC_2O_4$ and the tetraoxalate is $KHC_2O_4 \cdot H_2C_2O_4$.

18. The method of claim 12, wherein the Al-containing precipitate is processed to form aluminum oxide and the aluminum oxide is used as a feedstock for the production of aluminum metal.

19. A method for recovering a metal from a metal-containing material, the method comprising:
   (a) exposing a metal-containing material to a leaching solution comprising a solvent and a binoxalate having formula $AHC_2O_4$, a tetraoxalate having formula $AHC_2O_4 \cdot H_2C_2O_4$, wherein A is an alkali metal cation, or a combination thereof, under conditions to provide a leachate comprising a soluble metal oxalate;
   (b) inducing precipitation of a metal-containing precipitate comprising the metal of the soluble metal oxalate from the leachate; and
   (c) recovering the metal-containing precipitate,
   wherein at least two metals of the metal-containing material to be recovered are each present in the leachate as respective soluble metal oxalates.

20. The method of claim 19, wherein the metal-containing material is selected from bauxite, ilmenite, laterite, scheelite, an electrode material of a battery, and coal fly ash.

21. The method of claim 19, wherein the metal-containing material is selected from bauxite, laterite, scheelite, an electrode material of a battery, and coal fly ash.

22. The method of claim 19, wherein the metal-containing material is an electrode material of a battery.

23. The method of claim 22, wherein the binoxalate is $KHC_2O_4$, $NaHC_2O_4$, or a combination thereof and the tetraoxalate is $KHC_2O_4 \cdot H_2C_2O_4$.

\* \* \* \* \*